UNITED STATES PATENT OFFICE.

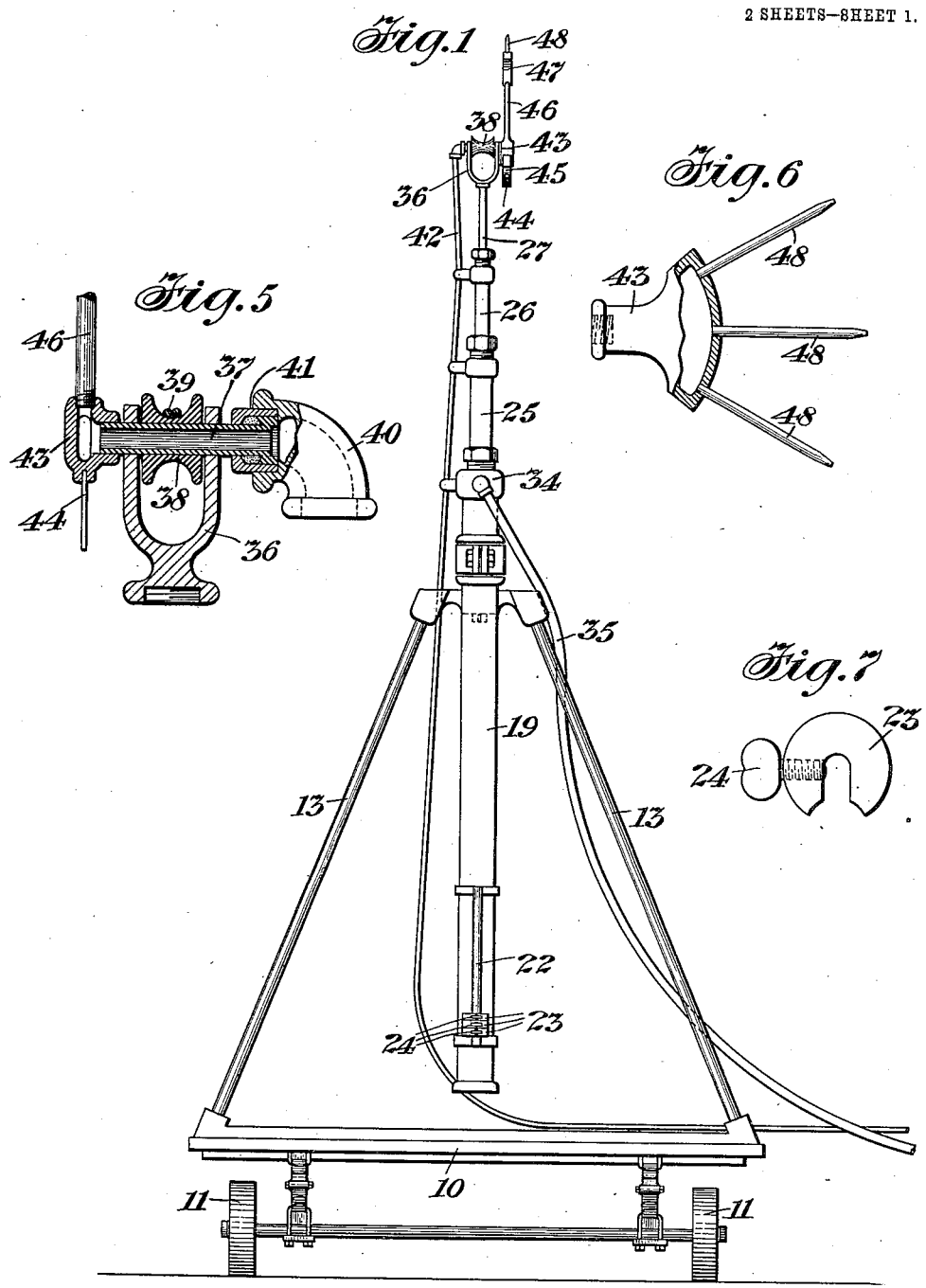

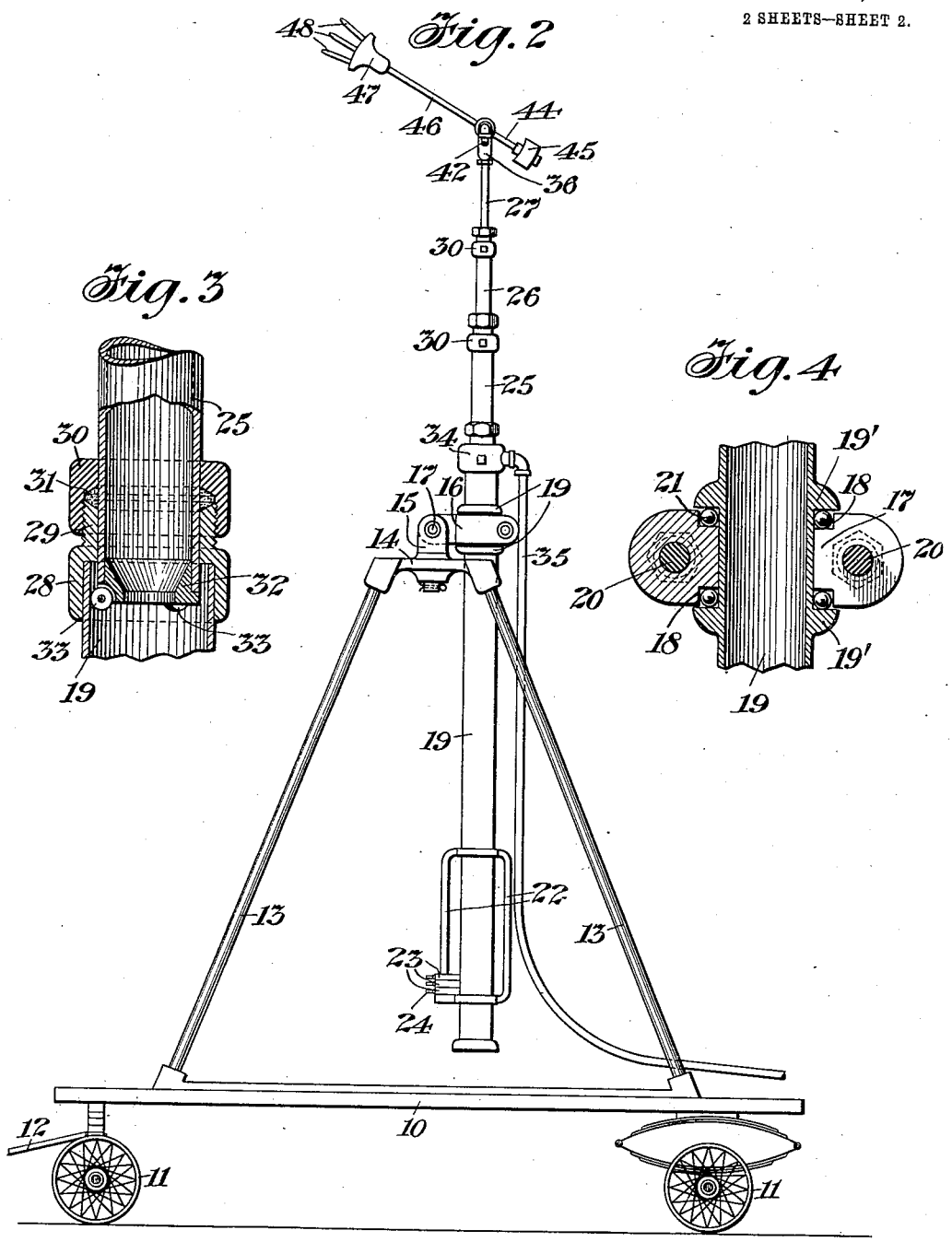

WALTER S. BOYCE, OF SARATOGA SPRINGS, NEW YORK, ASSIGNOR TO JAMES H. BOYCE & SON, OF SARATOGA SPRINGS, NEW YORK, A FIRM COMPOSED OF JAMES H. BOYCE AND WALTER S. BOYCE.

TREE-SPRAYER.

1,087,634.

Specification of Letters Patent. Patented Feb. 17, 1914.

Application filed May 19, 1913. Serial No. 768,403.

*To all whom it may concern:*

Be it known that I, WALTER S. BOYCE, a citizen of the United States, residing at Saratoga Springs, in the county of Saratoga and State of New York, have invented an Improvement in Tree-Sprayers, of which the following is a specification.

Heretofore, various devices have been designed for spraying trees, but so far as I am aware, in the use of none of these has it been possible to so spray the leaves of a tree as to reach all the parts of the same without climbing into the tree, and the object of my present invention is the construction and provision of an apparatus by which, from the ground or road-way, it is possible to so spray the tree as to reach both the inner and outer sides of all the leaves so that the same may be properly treated.

In carrying out my invention, I preferably employ a truck, upon which is mounted a plurality of telescoping pistons, which may be extended so as to reach the desired height. These pistons are preferably revolubly mounted longitudinally so as to be turned to any position about their axis, and adapted to be tilted to any required angle, and secured to the outer or free end of the outermost telescoping piston, I employ a revoluble device, to which a nozzle is secured, together with means for turning the revoluble device so as to turn the nozzle in any direction, making it possible, as will be hereinafter more particularly described, to so set the telescoping pistons and nozzle as to reach all the parts of a tree, with any desired spraying liquid.

In the drawing, Figure 1 is a front elevation of my improved tree sprayer. Fig. 2 is a side elevation of the same. Fig. 3 is an enlarged longitudinal cross section illustrating the manner in which the telescoping pistons are connected. Fig. 4 is a transverse cross section of a collar on which the telescoping pistons are revolubly mounted. Fig. 5 is a cross section of the revoluble member and associated parts to which the nozzle is connected. Fig. 6 is a sectional plan of a spraying nozzle, and Fig. 7 is a plan of the weights employed with a handle secured to the lowermost member of the telescoping pistons. Figs. 4 to 7, inclusive, also being shown on enlarged scales for the clearness of illustration.

Referring to the drawing, 10 indicates a truck provided with wheels 11, and if desired, intermediate springs, upon which my improved tree sprayer is preferably supported so as to be readily moved from one place to another. This truck, it will be understood, will be provided with a suitable pole 12, by which it may be drawn. Fixed on the truck are series of standards or inclined supports 13, fixed to the upper ends of which is a head 14. Suitably secured on the head 14, I may employ a lug 15, and pivotally connected, as indicated at 17, on the lug 14, is a divided collar indicated at 16. The inner surface of this collar is preferably provided with one or more race-ways 18. I also employ a plurality of telescoping pistons indicated at 19, 25, 26 and 27. The lowermost piston 19 is provided with flanges 19', on the surface of which are also provided race-ways similar to the race-ways 18 in the collar 16. The divided collar 16 of the piston 19 is received between the flanges 19' and secured therein by means of bolts 20 or otherwise, a series of balls 21 being employed in the race-ways between these parts to form bearings therefor, so that the piston 19 may be readily turned within the collar 16.

Adjacent to the lower end of the piston 19, the same may be provided with handles 22, to which may be secured one or more weights 23 employed to balance the apparatus when the same is tilted from a vertical position on the pivotal point 17, as will be readily understood. Each of these weights 23 is provided with a set screw 24, by means of which it may be clamped to position on the handle 22.

Each of the telescoping pistons fits and is movable within the next adjacent piston, and as illustrated in Fig. 3, the joint between the pistons is preferably made by employing a cap 28, fixed to the upper end of one piston. This cap 28 is provided with a cylindrical portion 29 of approximately the same interior diameter as the exterior diameter of the next adjacent piston, and through which the lower end of this next adjacent piston passes and is adapted to slide. On the lower end of this next adjacent piston is a collar 30, adapted to engage the cylindrical portion 29 of the cap 28, and between the collar 30 and the end of the cylindrical portion 29, I employ a suitable packing ring 31, in order to make a tight joint between these parts. In the lower end of each of the next adjacent pistons I may employ a member designated as 32, provided with suitable apertures, in which are revolubly mounted rollers indicated at 33, these rollers being so placed that they are adapted to contact with the inner surface of the piston.

Secured to the piston 19, and preferably at its upper end, is an inlet connection 34, to which a supply pipe 35 is connected. This supply pipe leads to a pump or other suitable mechanism by which the fluid under pressure may be supplied to the interior of the pistons to force the same apart to any desired extent, it being understood that the pistons may be forced apart by admitting the fluid under pressure and are brought together by shutting off the supply and withdrawing the fluid under pressure.

Suitably fixed on the outer or free end of the uppermost piston 27 is a bifurcated head 36. Revolubly mounted in this bifurcated head is a pipe 37. Fixed to the pipe 37 between the bifurcated portions of the head 36, is a roller 38 around which a rope 39 or other similar device passes in order that by the roller 38 the pipe 37 may be revolved. Suitably swiveled, as indicated at 41, to one end of the pipe 37 is an elbow 40, to which is also connected a pipe 42 for supplying the liquid to be used in spraying a tree, the liquid being forced from a suitable source of supply through the pipe 42 by any suitable means. Fixed on the opposite end of the pipe 47 is a head 43, extending from which is an arm 44 adapted to carry a weight 45, employed to balance the parts when fixed in any desired position. Extending from the head 43, in a position diametrically opposite to the arm 44, is a pipe arm 46, at the end of which a nozzle 47 is secured. This nozzle 47 may be provided with a series of spraying tips 48, as indicated, or the liquid with which the tree is to be treated may escape from the nozzle through any other suitable means without departing from the nature of my invention.

As will be understood from the foregoing description, the telescoping pistons may be extended to any desired length, within their limit of extension, which is sufficient to reach the top of the highest tree. These telescoping pistons may be turned to any position about their axis within the collar 16, and may also be tilted to any desired angle about the pivotal point 17. Furthermore, the nozzle may be so turned to any desired position as to reach not only the under side but also the outer side of the leaves of a tree by turning the revoluble pipe 37 through the roller 38 so as to set the nozzle in the required position to accomplish this purpose.

I claim as my invention:

1. A tree sprayer apparatus comprising a plurality of telescoping pistons, a divided head secured to the free end of the outermost telescoping piston, a delivery pipe journaled in the divided parts of the said head, a roller secured on the said delivery pipe, a supply pipe connected to one end of the said delivery pipe, a nozzle connected to the opposite end of the said delivery pipe, and means passing over the said roller for turning the said delivery pipe to set the nozzle in a required position.

2. A tree spraying apparatus comprising a plurality of telescoping pistons, a divided head secured to the free end of the outermost telescoping piston, a delivery pipe journaled in the divided parts of the said head, a roller secured on the said delivery pipe, a supply pipe connected to one end of the said delivery pipe, a nozzle connected to the opposite end of the said delivery pipe, means passing over the said roller for turning the said delivery pipe to set the nozzle in a required position, and an inlet connection to the innermost telescoping piston for admitting fluid under pressure thereto to raise the pistons to a required height.

3. A tree spraying apparatus comprising a plurality of telescoping pistons, a bifurcated head secured to the free end of the outermost telescoping piston, a delivery pipe journaled in the bifurcated portion of the said head, a roller secured to the said delivery pipe, a pipe connection swiveled to one end of the said delivery pipe, a supply pipe connected to the said pipe connection, a nozzle connected to the opposite end of the said delivery pipe, and means passing over the said roller for turning the delivery pipe to set the nozzle in a required position.

4. A tree spraying apparatus comprising a plurality of telescoping pistons, a bifurcated head secured to the free end of the outermost telescoping piston, a delivery pipe journaled in the bifurcated portion of the said head, a roller secured to the said delivery pipe, a pipe connection swiveled to one end of the said delivery pipe, a supply pipe connected to the said pipe connection, a nozzle connected to the opposite end of the said delivery pipe, means passing over the said roller for turning the delivery pipe to set the nozzle in a required position, and an inlet connection to the innermost telescoping piston for admitting fluid under pressure thereto to raise the pistons to a required height.

5. A tree spraying apparatus comprising a plurality of telescoping pistons, means for so mounting the same that they are revoluble about their axis and may also be tilted to a required angle, a bifurcated head secured to the free end of the outermost telescoping piston, a delivery pipe journaled in the bifurcated portion of the said head, a roller secured to the said delivery pipe, a pipe connection swiveled to one end of the said delivery pipe, a supply pipe connected to the said pipe connection, a nozzle connected to the opposite end of the said delivery pipe, and means passing over the said roller for turning the delivery pipe to set the nozzle in a required position.

6. A tree spraying apparatus comprising a plurality of telescoping pistons, means for so mounting the same that they are revoluble about their axis and may also be tilted to a required angle, a bifurcated head secured to the free end of the outermost telescoping piston, a delivery pipe journaled in the bifurcated portion of the said head, a roller secured to the said delivery pipe, a pipe connection swiveled to one end of the said delivery pipe, a supply pipe connected to the said pipe connection, a nozzle connected to the opposite end of the said delivery pipe, means passing over the said roller for turning the delivery pipe to set the nozzle in a required position, and an inlet connection to the innermost telescoping piston for admitting fluid under pressure thereto to raise the pistons to a required height.

7. A tree spraying apparatus comprising a plurality of telescoping pistons, means for so mounting the same that they are revoluble about their axis and may also be tilted to the required angle, a bifurcated head secured to the free end of the outermost telescoping piston, a delivery pipe journaled in the bifurcated portions of the said head, a roller secured to the said delivery pipe between the bifurcated portions of the said head, a supply pipe connected to one end of the said delivery pipe, a nozzle connected to the opposite end of the said delivery pipe, and means passing over the said roller whereby the delivery pipe may be revolved to set the nozzle in a required position.

8. A tree spraying apparatus comprising a plurality of telescoping pistons, a collar in which the said telescoping pistons are revolubly mounted, a device to which the said collar is pivotally connected so that the said pistons may also be tilted to a required angle, a bifurcated head secured to the free end of the outermost telescoping piston, a delivery pipe journaled in the bifurcated parts of the said head, a roller secured to the delivery pipe between the bifurcated parts of the said head, a supply pipe connected to one end of the said delivery pipe, a nozzle connected to the opposite end of the said delivery pipe, and means passing over the said roller by which the delivery pipe may be turned to set the nozzle in a required position.

Signed by me this 12th day of May, 1913.

WALTER S. BOYCE.

Witnesses:
JOHN F. BURNS,
JAS. H. ROWE.

Copies of this patent may be obtained for five cents each, by addressing the "Commissioner of Patents, Washington, D. C."